(12) United States Patent
McCoy et al.

(10) Patent No.: US 10,171,884 B2
(45) Date of Patent: Jan. 1, 2019

(54) METHOD AND APPARATUS FOR SHARING INTERNET ASSETS OR CONTENT URLS VIA A SECOND DISPLAY DEVICE

(71) Applicant: Sony Interactive Entertainment LLC, San Mateo, CA (US)

(72) Inventors: Charles McCoy, Coronado, CA (US); Ling Jun Wong, Singapore (SG); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 14/082,351

(22) Filed: Nov. 18, 2013

(65) Prior Publication Data

US 2015/0143442 A1 May 21, 2015
US 2018/0343504 A9 Nov. 29, 2018

Related U.S. Application Data

(62) Division of application No. 13/327,155, filed on Dec. 15, 2011, now Pat. No. 8,589,986.

(60) Provisional application No. 61/441,852, filed on Feb. 11, 2011.

(51) Int. Cl.
*H04N 21/61* (2011.01)
*H04N 21/41* (2011.01)
*H04N 21/435* (2011.01)
*H04N 21/462* (2011.01)
(Continued)

(52) U.S. Cl.
CPC ..... *H04N 21/6175* (2013.01); *H04N 21/4122* (2013.01); *H04N 21/435* (2013.01); *H04N 21/462* (2013.01); *H04N 21/4788* (2013.01); *H04N 21/8586* (2013.01)

(58) Field of Classification Search
None
See application file for complete search history.

(56) References Cited

U.S. PATENT DOCUMENTS

| 8,464,066 B1 * | 6/2013 | Price .................... H04L 63/10 709/217 |
| 2004/0117845 A1 * | 6/2004 | Karaoguz et al. ............ 725/134 |
| 2005/0262530 A1 | 11/2005 | Ruetschi et al. |

(Continued)

FOREIGN PATENT DOCUMENTS

| CN | 101803371 | 8/2010 |
| CN | 101945252 | 1/2011 |

(Continued)

OTHER PUBLICATIONS

Office Action issued in corresponding Chinese application No. 201210021334.8 dated Apr. 1, 2014 and the English translation.

*Primary Examiner* — Jason K Lin
(74) *Attorney, Agent, or Firm* — Haug Partners LLP; William S. Frommer

(57) ABSTRACT

A user can share Internet assets or content URLs via a second display device with other Internet content service users. Thus, the other users will be able to view the same content on their own internet protocol televisions (IPTV), as first display devices, without the need to search for the content in the content providing service. When the shared content is URLs, the recipient can even preview the content from the URL on the second display device before sending it to the recipient's internet protocol television (IPTV).

6 Claims, 10 Drawing Sheets

(51) Int. Cl.
  *H04N 21/858* (2011.01)
  *H04N 21/4788* (2011.01)

(56) References Cited

U.S. PATENT DOCUMENTS

| | | | |
|---|---|---|---|
| 2007/0124769 A1 | 5/2007 | Casey et al. | |
| 2009/0007187 A1 | 1/2009 | Koul | |
| 2009/0199255 A1* | 8/2009 | Yasrebi et al. | 725/118 |
| 2009/0328123 A1* | 12/2009 | Alkove | H04N 21/2541 |
| | | | 725/114 |
| 2010/0205628 A1* | 8/2010 | Davis et al. | 725/25 |
| 2011/0023073 A1 | 1/2011 | McCarthy et al. | |
| 2012/0131458 A1* | 5/2012 | Hayes | H04N 21/41407 |
| | | | 715/716 |
| 2012/0210371 A1* | 8/2012 | McCoy | H04N 21/42219 |
| | | | 725/62 |

FOREIGN PATENT DOCUMENTS

| | | |
|---|---|---|
| CN | 103207957 | 7/2013 |
| WO | WO 2010/018421 | 2/2010 |

\* cited by examiner

METHOD AND APPARATUS FOR SHARING INTERNET ASSETS OR CONTENT URLS VIA A SECOND DISPLAY DEVICE

This is a division of application Ser. No. 13/327,155, filed Dec. 15, 2011, with a claim of priority to provisional application 61/441,852, filed Feb. 11, 2011, the entirety of which is incorporated herein by reference.

CLAIM TO PRIORITY

This application claims the benefit of previously filed provisional application Ser. No. 61/441,852, filed on Feb. 11, 2011, which is hereby incorporated by reference in its entirety herein.

BACKGROUND

1. Field of the Invention

This application relates generally to controlling an Internet Protocol Television (IPTV) using a second device. Embodiments of the present invention allow a user to share Internet video linked contents or content URLs via a second display device with other users or subscribers. Thus, other users or recipients will be able to view the same content on their own IPTV (Internet protocol TVs) without the need to search for the contents on the Internet service itself. When content URLs are shared, the recipient can preview the contents on the second display device before sending it to his/her own IPTV (first display device).

2. Background Discussion

Internet access through TVs is typically provided by essentially programming the TV (often referred to as an Internet Protocol TV, or IPTV) as though it were a computer executing a browser. Such internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet, such as e.g., might be derived, as understood, herein, by pay-per-view based on one or more options.

IPTV is capable of receiving services delivered using the architecture and networking methods of the Internet Protocol Suite as well as services delivered using a broadcasting network. MTV services include, for example, live television, time-shifted programming, video on demand (VOD), and on-line transactions.

SUMMARY OF THE INVENTION

When users browse content on the IPTV (first display device), frequently users will want to share interesting content (IPTV and/or Internet) with other users/friends. Current Internet accessible systems IPTVs do not allow sharing contents among other IPTV users. Additionally, even if IPTVs allows content sharing, it is difficult to do it across different platforms, e.g. Blu-ray® disk players (BDP) and digital tv's (DTV) because of different platform software. Thus, it would be an advancement in the ad to have an easy way to share content so that it is accessible, easy to share and is uniform for users.

Sharing content is easy on the internet between personal computers (PC) since they use the same software platforms. However, for other platforms, such as Blu-ray® disc players (BDP) and digital tv's (DTV), a challenge arises in terms of synchronization and software uniformity.

The present invention allows a user to share internet contents/assets or content URLs via a second display device with other IPTV users or subscribers. This means that the other users will be able to view the same content on their own IPTVs without the need to search for the content in the IPTV content providing service itself.

When Internet content URLs are shared between users, the recipient of the content URL can preview it on the second display device itself before sending it to the IPTV (first display device).

Accordingly, one embodiment of the present invention is directed to a system ("the system") for sharing content on an internet protocol TV (IPTV) system. The system includes one or more first display devices, displaying content. One or more second display devices (control displaying devices), each of which has a list of recipients associated with the IPTV system, are used for sharing the content. The second display devices also are able to access the Internet, by using a web browser. The system also includes a server device that has contents for display on the first display devices and which receives, from the second display devices, a request to share content and a list of selected recipients to share the content therewith. Furthermore, the server device includes a mapping device that is used to map all recipients in the selected list of recipients with at least one second display device associated with each selected recipient such that the content is available to the selected recipients. The server device may also includes a notifying device that notifies the second display device of the selected recipients that content is available for viewing on the recipients first display device.

Yet another embodiment of the present invention is directed to the system described above, wherein when content to be shared are content URLs, the second display device of the selected recipients are capable of previewing the content on the recipient's second display device before the second display device of the recipient sends the content to the recipient's first display device.

Yet another embodiment of the present invention is directed to the system described above, wherein the content to be shared includes internet content and content URL's.

Yet another embodiment of the present invention is directed to the system described above, wherein the server device is a content provider server for IPTV devices.

Yet another embodiment of the present invention is directed to the system described above, wherein the second display device includes a selecting device which selects at least one recipient from the list of recipients.

Yet another embodiment of the present invention is directed to the system described above, wherein the first display device is an internet protocol television (IPTV).

Yet another embodiment of the present invention is directed to the system described above, wherein the second display device includes at least one of a cell phone, laptop computer and personal computer.

Yet another embodiment of the present invention is directed to a control display device for a content providing system having IPTVs (Internet protocol TVs) as first display devices. The control display device includes a storing device storing a list of recipients for sharing contents (the recipients being associated with the content providing system). The control display device also includes a web browsing device that browses contents in the content providing system. Additionally, the control display device includes a sending device that sends a share request to a server and sends therewith at least one recipient from the list of recipients for sharing contents. The control display de ice includes a receiving device that receives notification from the server that content is available for sharing and a forwarding device forwarding the content to one of the first display devices for displaying content.

Yet another embodiment of the present invention is directed to the control display device, wherein the content to be shared includes internet content having content URLs and content only available on IPTV devices using IPTV protocol.

Yet another embodiment of the present invention is directed to the control display device, wherein when content to be shared are content URLs, the control display device of the recipients are capable of previewing the content on the recipient's control display device before the control display device of the recipient sends the content to the recipient's first display device which is independent of the control device.

Yet another embodiment of the present invention is directed to the control display device, wherein the server device is a content provider server.

Yet another embodiment of the present invention is directed to the control display device, that also includes a playback device which plays back content when the shared content is a content URL.

Yet another embodiment of the present invention is directed to the control display device, wherein the control display device being one of a cell phone, laptop computer and a personal computer.

In another embodiment of the control display device, when content to be shared are IPTV content, the control display device of the recipients are not capable of previewing the content on the recipient's control display device before sending the content to the recipient's first display device which is independent of the control display device.

Yet another embodiment of the present invention is directed to a server for a content providing system. The content providing system includes internet protocol televisions (IPTVs) as first display devices and second display devices which designates content for sharing. The server includes a receiving device that receives, from one of the second display devices, a request to share content and a list of recipients to share the content therewith. The recipients are associated with the content providing system. The server also includes a mapping device that maps the recipients on the list with their respective second devices. The server also includes a notification device to notify the second devices of the recipients on the list mapped by the mapping device that contents are available for sharing.

Yet another embodiment of the present invention is directed to the server, wherein the content to be shared includes internet content having content URL's and content only available to IPTV devices using IPTV protocol.

Yet another embodiment of the present invention is directed to the server, wherein when content to be shared are content URLs, the second display device of the recipients are capable of previewing the content n the recipient's second device before the second display device of the recipient sends the content to the recipient's first display device.

Yet another embodiment of the present invention is directed to the server, wherein the server device is a content provider server.

Yet another embodiment of the present invention is directed to the server, wherein the second display device includes a web browser and is one of a cell phone, laptop computer and a personal computer.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
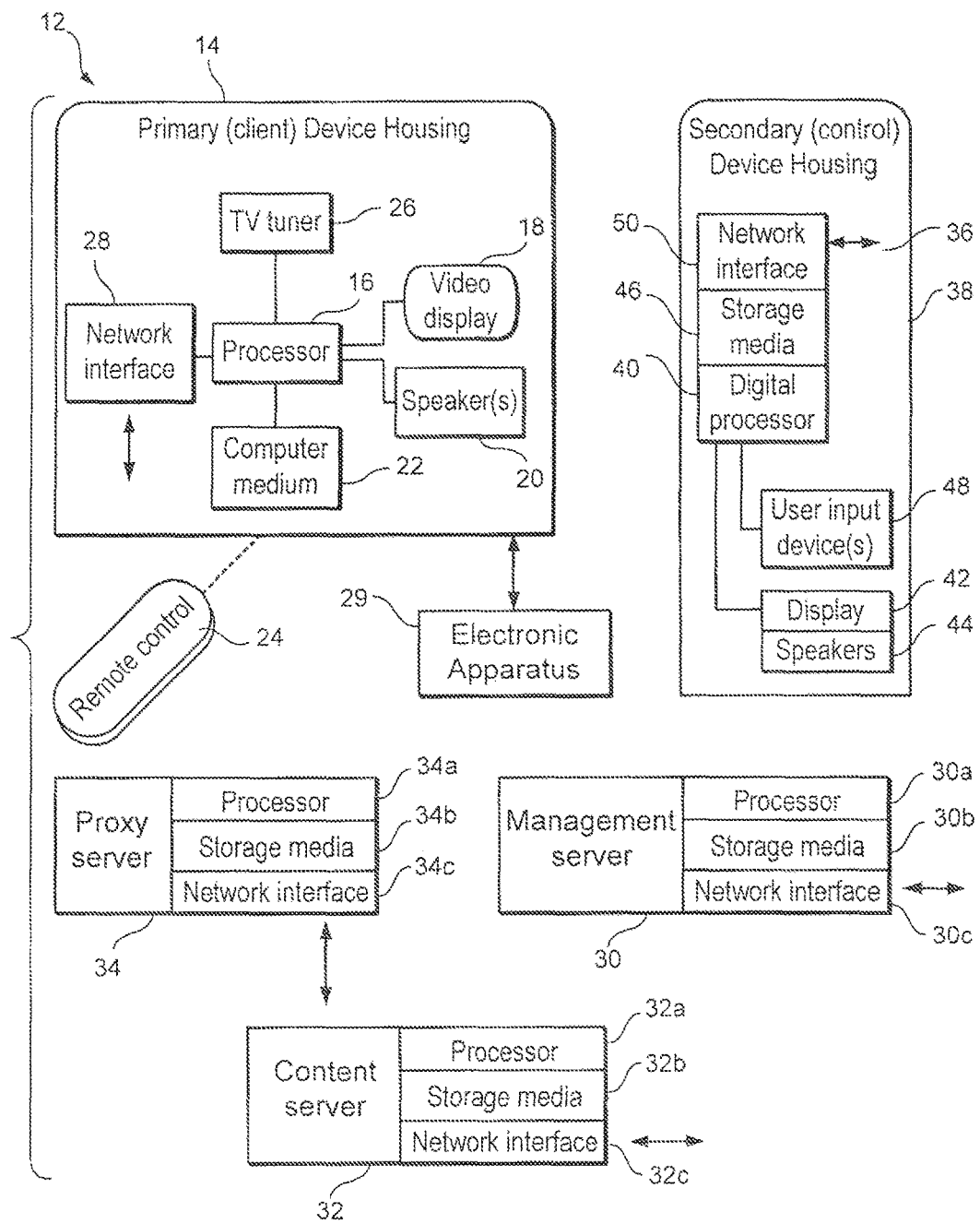
FIG. 1 shows a block diagram of one embodiment of the present invention.

It is noted that in this disclosure and particularly in the claims and/or paragraphs, terms such as "comprises," "comprised," "comprising," and the like can have the meaning attributed, to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing facilities, or processing modules. The processing devices, or facilities or modules, may be coupled such that portions of the processing and/or data manipulation may be performed at one or more processing devices, facilities or modules and shared or transmitted between a plurality of processing devices, facilities or modules.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user browsing content on a second device to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, MYLO®, personal computer, or other apparatus with sufficient processing and storage capability, or any device with a web browser. Concurrently, while a user is using the first device, another user can perform these activities on the second device and send a media selection to the first device of the user's choice for playback.

A second device may act as a visual aid to the IPTV, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities. It is a favorable complement to the IPTV because the device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in HTML, which can be loaded by any device with a browser, hence not limited to only a small set of compatible devices.

An IPTV system typically includes an IPTV device being and IPTV client and including an IPTV client processor controlling a video display to present content thereon. The system also includes a second device including a control processor and a management server communicating with the IPTV client over the Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client to a the content server to obtain content from the content server. The management server receives and stores a local IP address of the IPTV client. Responsive to the second device sending a request to the proxy server for an executable utility, the proxy server returns the utility to the second device.

Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display.

Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the MTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronics device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or interact to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have one or both a wired communication interface and a wireless communication interface.

The client consumer electronics device (CE) 12 such as a TV, game player, video disk player, camera, digital clock radio, mobile telephone, personal digital assistant, laptop computer, etc, includes a portable lightweight plastic housing 14 bearing a digital processor 16. The processor 16 can control a visual display 18 and an audible display 20 such as one or more speakers. The client consumer electronics device has a unique identifier that, without other means, is able to identify the client consumer electronics device within the wry system. The unique identifier may be assigned by a manufacturer or assigned by the management server when the client consumer electronics device is registered in the IPTV system.

To undertake present principles, the processor 16 may access one or more computer readable storage media 22 such as but not limited to RAM-based storage (e.g., a chip implementing dynamic random access memory (DRAM) or flash memory or disk based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c, It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device 29 is connected with the first device 12 using a cable such as a 1394 cable or a HDMI cable or using a wireless communication interface such as infrared signals. The electronic device 29 may be a digital video recorder, a Blu-ray player, a game player, an audio amplifier, or an air conditioner.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers.

To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2A:
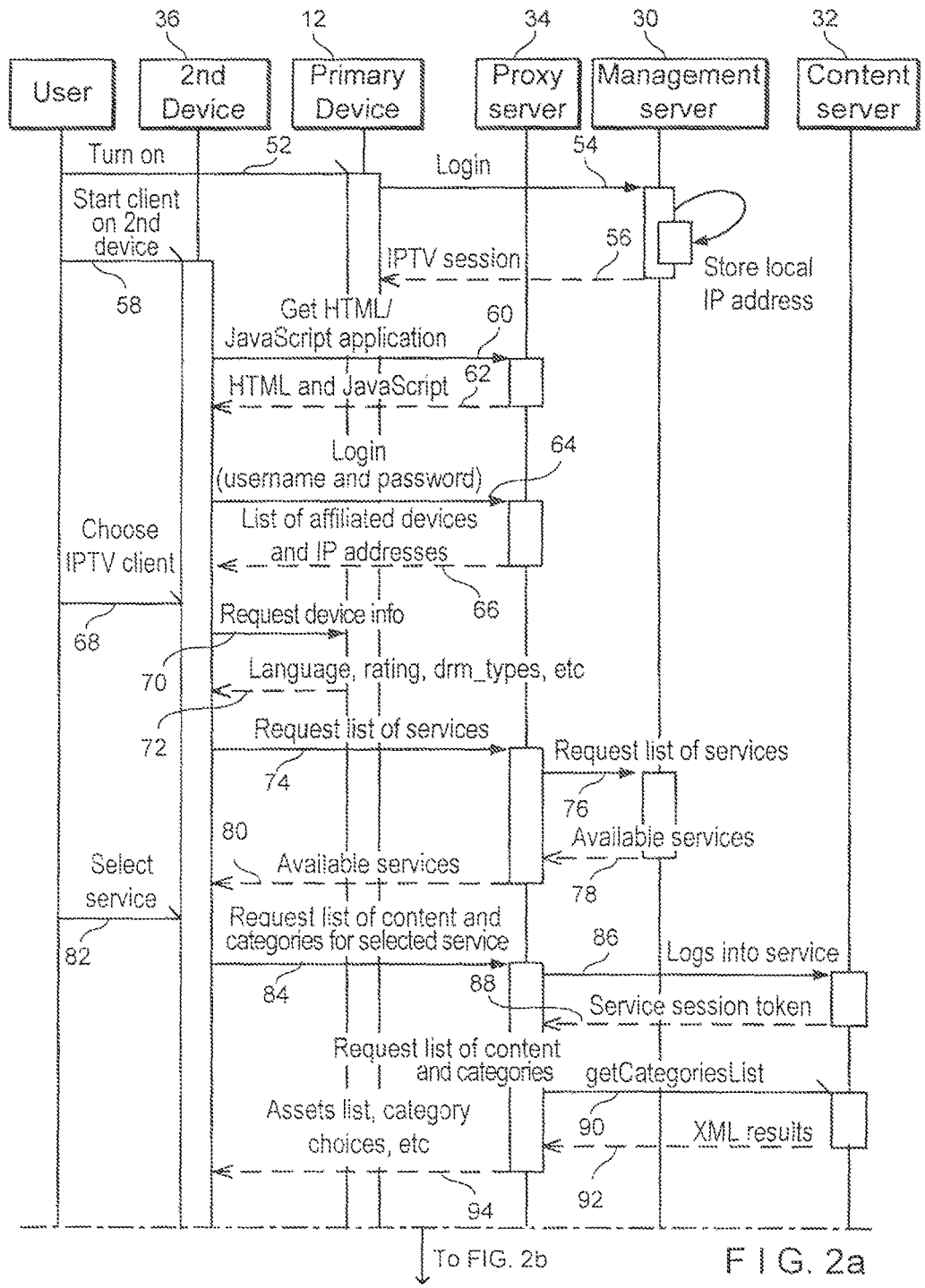
FIGS. 2a and 2b show a series of steps according to an embodiment of the present invention.
Figure 2B:
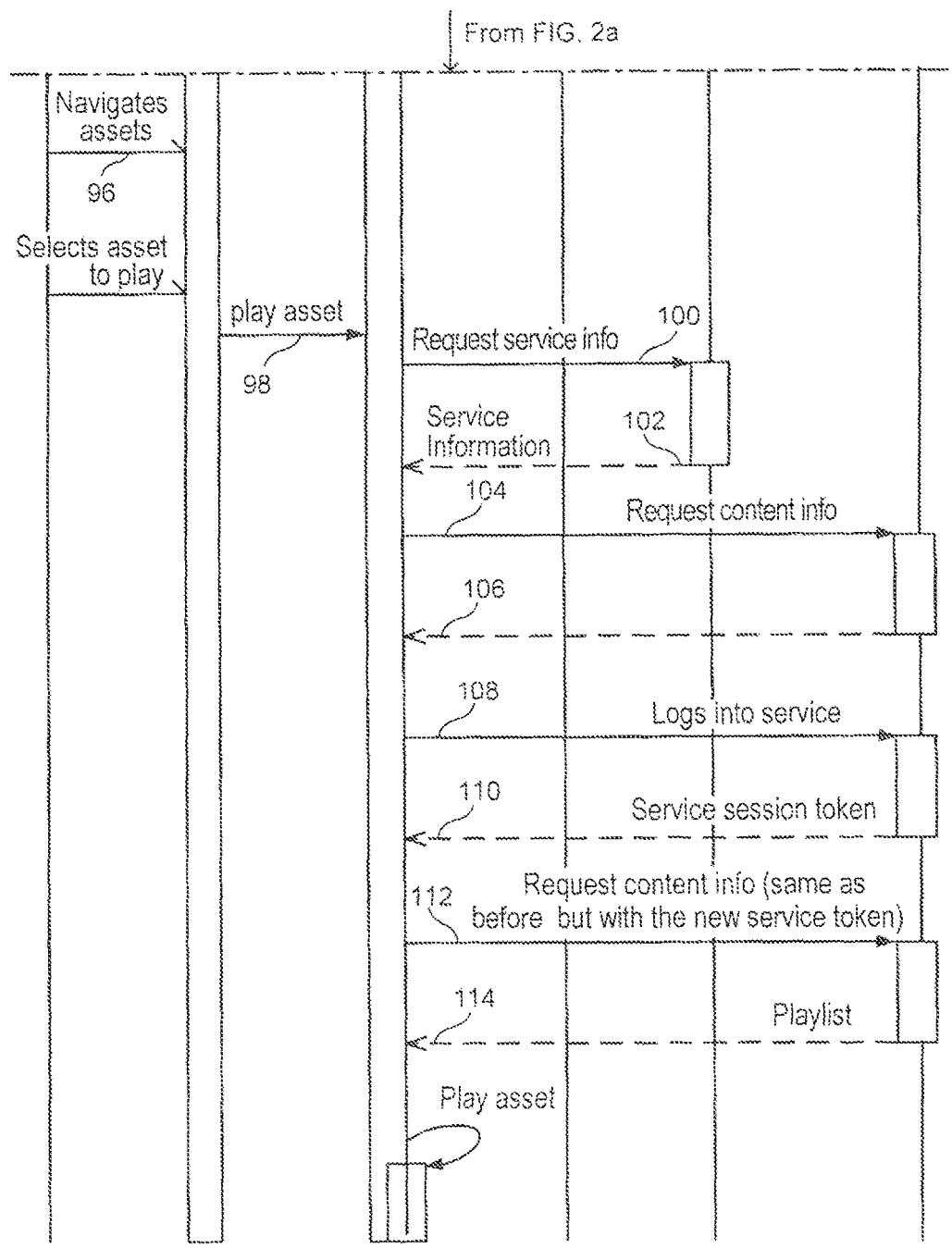

FIGS. 2a and 2b (generally FIG. 2) show an example embodiment of present principles for enabling a user to use a second device 36 to browse assets and select one to have a first device 12 such as a main IPTV client play the content. FIG. 2 assumes that the user has already created an account with the management server 30 and has affiliated the main IPTV device with that account. In general, a user loads the second application, which may be a web application in the second device and logs into their user account, which may be the same account used for device registration. Once logged in, a list of compatible IPTV devices is presented.

After the user selects a device, a list of services that the device is entitled to is provided. The user browses the services and their content, in his/her preferred language, on the second device as though it is an actual IPTV device such as the first device, Similar transactions, like video rentals or home shopping purchases, can also be made on the second device, Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for playback in the form of a reference id which is used by the IPTV to retrieve playback information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list, and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local IP address of the IPTV client device 12. Alternatively, in another embodiment, the management server 30 does not return a token in response to receiving login information. Subsequently, no token is required to be presented by the IPTV client device to the participating content server 32 to obtain, content.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript for the second device 36 to execute in accordance with description below. This JavaScript® makes asynchronous JavaScript® and extended markup language (XML) (AJAX) calls to the proxy server and to the IPTV client to obtain information to control the IPTV client. In another embodiment, step 60 may not be necessary where other client application implementations are used, such as one where the client application is not downloaded each time it is used. It should also be noted that other technologies (e.g. C, C++, Perl®, and Flash®) can be used for the implementation of the client application and that neither HTML nor JavaScript® are required.

With more specificity, at state 64 using the JavaScript®, or alternatively, another method of implementing the client application, received from the proxy server 34 the second device 36 prompts the user to input to the second device 36 the user account information, such as account login information, including, e.g., the same user name and password that the IPTV client provided to the management server 30 at 54. Thus, the servers 30, 32, 34 communicate necessary account information between the as needed to realize present principles.

At state 66 the proxy server 34, responsive to a correct user name and password from the second device 36, returns information about all IPTV clients 12 that are affiliated with the user account associated with the user name and password, including their local IP addresses which were stored by the management server 30 after login at 54 (and subsequently provided to the proxy server 34).

When the user inputs to the second device 36 at state 68 a selected IPTV client device (in this example, the IPTV client device 12) to use with the second device, the second device 36, using the local IP address returned at state 66, accesses the IPTV client device 12 directly. The second device 36 requests information about the IPTV client device 12 at state 70, including language information, rating information, digital rights management (DRM) information, etc. as desired, which information is returned from the IPTV client device 12 to the second device 36 at state 72. Since the second device 36 knows the IP address of the IPTV client device 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the available services at state 78 to the proxy server 34. The proxy server 34 in turn sends the services list to the second device 36 at state 80 for presentation of available services on, e.g., the second device display 42.

State 62 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service of the content server 32 providing the selected service. At state 88 the content server 32 provides to the proxy server 34 service session token for the particular content server 34. State 90 indicates that if desired the proxy server 34 may also request a list of content and categories of the content server 32 and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client device 12 to play the selection. At state 100 the IPTV client device 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. If the IPTV client is already playing content the new content commanded to be played by the second device is placed in a queue in the IPTV client and played when the current content completes.

Furthermore, the second device may command the IPTV client to play content by sending to the IPTV client over the home network commands coded as if they were sent from an infrared remote control (IR RC), specifically for example the commands may be in Sony Infrared Remote Control System (SIRCS) protocol. The second device may transmit command signals to the IPTV client to control the electronic device 29.

As shown in FIG. 2, if desired, temporally between states 102 and 116 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request of content information may be made (112) and a playlist returned to (114) the IPTV client device 12.

The software (e.g., JavaScript®/HTML) that is downloaded at state 62 can be made available to all electronic vendors who wish their users to be able to navigate, browse, and search IPTV content on a second device. In an embodiment in which HTML is used, the software can be used on any client device with a web browser.

The following situations illustrate some scenarios where the second device complements the IPTV's shortcomings, hence providing better user experience for the IPTV user. For example, a group of friends is watching video clips on an IPTV, Each of them are browsing content on their own second display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a second display to select a movie for them to watch when the game ends. In another example, a user may be away from an IPTV, but the user may use a smart phone as the second device to browse contents and select a preferable content to be played on the IPTV.

In the above-identified situations, using a second device can provide many benefits, such as Browsing in own language without disturbing the big screen Ease of data entry in a language not supported by the IPTV On-device service affiliation for premium services like Netflix Cross-device playback and resume from a recently viewed list Social sharing of content to enhance content proliferation Management of subscription-based services from a single location Browsing and queue management when away from the IPTV device or when not in proximity to the IPTV device One-click Customer service without the need of entering personal or device information Quick access to relevant device specifications and manuals Hyper-linked text in forms directs users to informational sites Content Queue across devices Advertisement revenue through Second display usage The second device provides an enhanced user experience of the IPTV without adding to the hardware costs of the unit. It makes data entry easy and allows users to browse content on the side. It is also a global solution which connects various IPTVs together in a cohesive manner through its potential of initiating playback across devices. It also provides the highest level of customer service to users through its one-click customer service feature, where users do not even need to provide any device information which can be difficult to retrieve in the event of a device breakdown.

Figure 3:
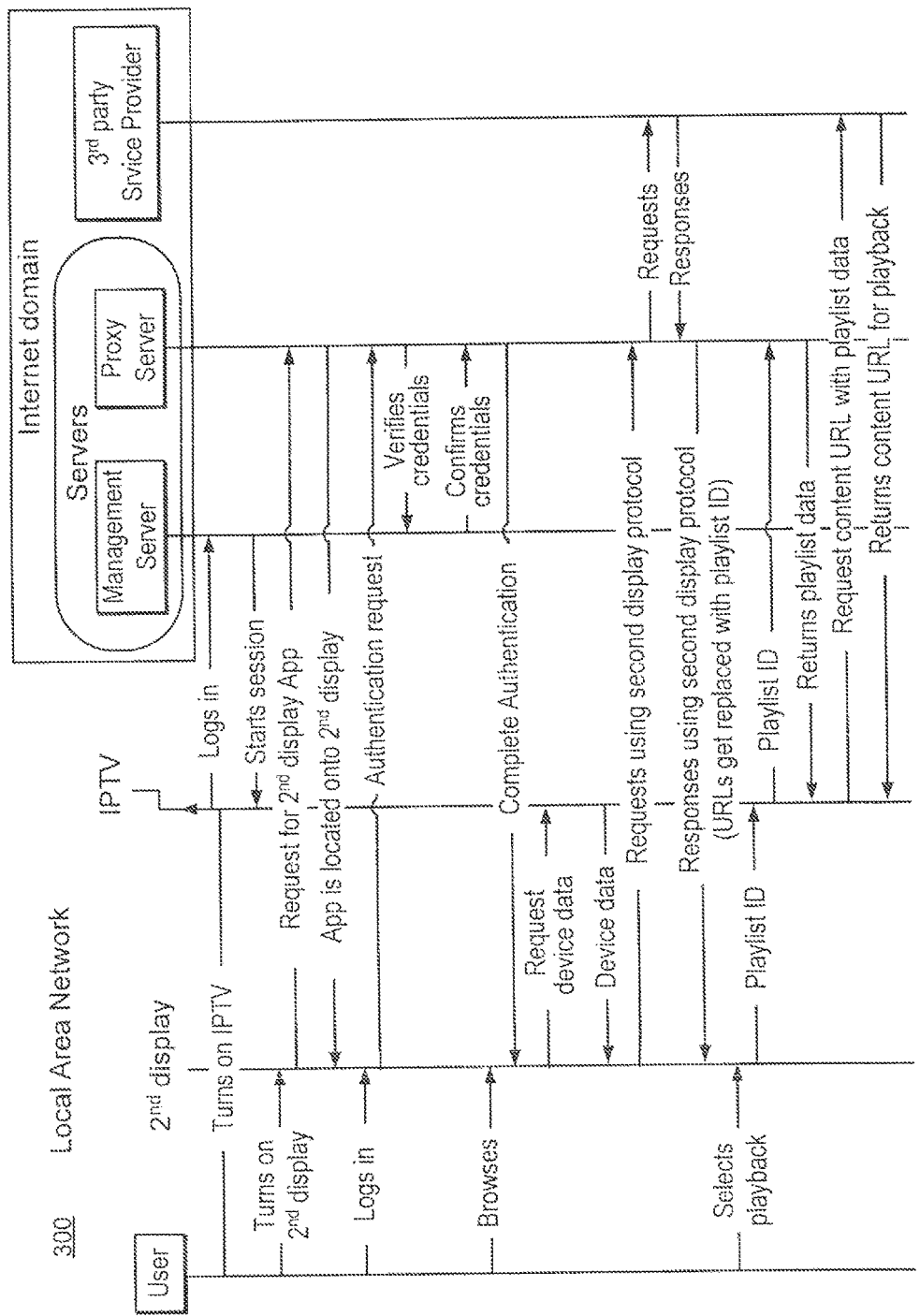
FIG. 3 shows a schematic representation of an embodiment of the present invention.

FIG. 3 shows a schematic representation 300 of an embodiment in which the present invention finds ready application. First a user turns on an IPTV client. The IPTV logs into a management server so that the management server knows which IPTV device is in communication. The user does not have to interact or provide any information as part of this device interaction. The management server starts the session. Then the user turns on the second display. In an embodiment in which the second display does not have the second display application, the second display requests the second display web application (app) from the proxy server and the second display web application is loaded onto the second display. In another embodiment, the second display application is installed on the second display. Then the user logs into the user account. An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display and then the requested device data is sent from the proxy server to the second display device. Thus, the second display device can be used to display content even when the IPTV device is not available. The use of the second display device to display content depends on the display capabilities and display functions of the second display device. The second display sends a request using second display protocol to the proxy server, and then the proxy server requests to service provider, and the service provider responds. The proxy server responds using a second display protocol to the second display with the associated URL replaced with playlist ID.

After the user selects playback, the second display device attempts to send the playlist ID to the IPTV client device. When the IPTV client device is reachable, the playlist ID is received. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client device. When the IPTV client device is not reachable, the playlist ID is not received and the second display device notifies the user that the IPTV client device is not reachable. The second display device stores the Play list ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
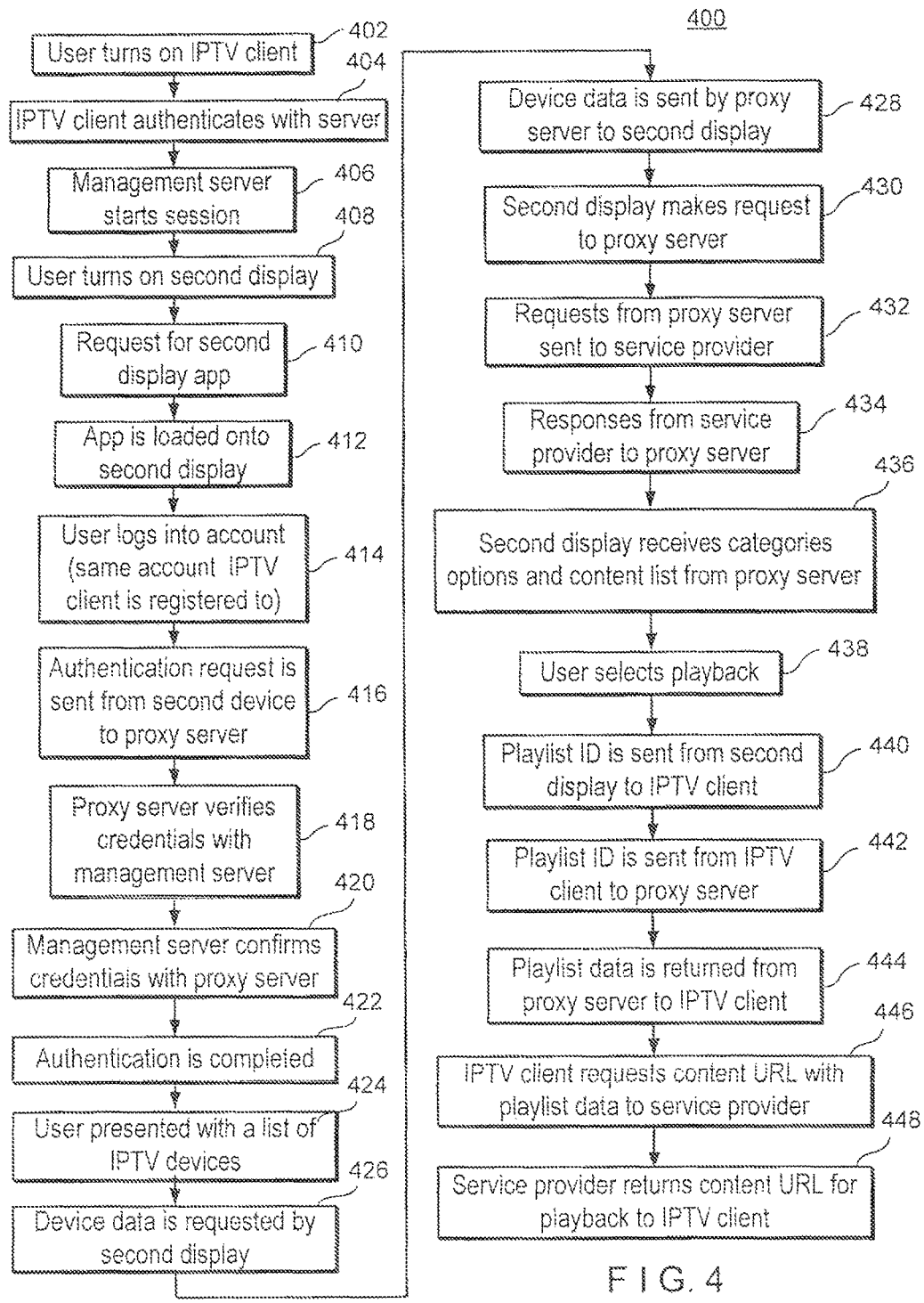
FIG. 4 shows a flow chart of processing steps according to an embodiment of the present invention.

FIG. 4 shows a flow chart 400 of processing steps according to the embodiment of FIG. 3.

The process begins in step 402 in which the user turns on IPTV client device. After the IPTV device is registered with the management server, or authenticated with the management server, as shown in step 404, the management server starts the session in step 406. Then in step 408 the user turns on the second display, and, when necessary, requests for second display web application to a proxy server, as shown in step 410, The request for the second display application is optional and is used only when desired. When requested, the web application is loaded onto second display in step 412. In step 414 the user logs into the account, which is the account the IPTV is registered. In step 416 authentication request is sent from the second display to the proxy server. In step 418 the proxy server verifies credentials with the management server, and then in step 420 the management server confirms credentials with the proxy server. In step 422, authentication is completed. It is an embodiment of the present invention that the server in steps 418 and 420 may be in the same server. Alternatively, there may be more than two servers splitting the server tasks.

In step 424 the user browses the Internet video link (IVL) and the user is presented with a list of IPTV devices. In step 426 the device data is requested by the second display device and then in step 428 the requested device data is sent by the proxy server to the second display device, in step 430 the second display sends a request using a second display protocol to proxy server, and then in step 432 the proxy server requests from proxy server and the service provider responds, as shown in step 434. In step 436, the second display device receives categories, options and a content list from the proxy server. Alternatively, the proxy server may send content to the second display device with the associated URL replaced with playlist ID. Alternatively, the service provider may permit, in some cases that the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects playback and then in step 440 the playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable.

In step 442 the playlist ID is sent from IPTV client to proxy server, and returned from proxy server to IPTV client in step 444, In step 446 IPTV client requests content URL, with playlist data to service provider, and then in step 448 the service provider returns content URL for playback to the IPTV client device. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

Referring back to FIG. 1, when Internet content users browse content on their internet protocol televisions (IPTV) 12, as first display devices, there often is a urge to share content with other users/friends. The content to be shared may be content that is publically available on the internet through a URL or may be content that is only available to IPTV devices 12 through the use of the IPTV protocol.

Current Internet content providing systems on internet protocol televisions (IPTV) 12 do not allow sharing of content. Additionally, even if internet protocol TV's (IPTV) 12 allow this, there is a problem to do so across different platforms such as Blu-ray® disc players (BDP) 29 and digital tv's 29 (DTV) due to the different platform software.

While sharing content is easy on the internet between personal computers, it becomes a challenge with other platforms due to the terms of synchronization and software uniformity. The present invention allows a user to share contents/assets or content URLs via a second display device (control display device) 36 with other users or subscribers to the content providing service. This means that the other users will be able to view the same content on their own internet protocol television (IPTV) 12 without the need for searching for the content in the content providing service itself. When internet content URLs are shared, the recipient can preview, on the second display device 36 itself, the content accessed from the URL, before sending it to the interact protocol television (IPTV) 12 as the first display device. However, when the content being shared is IPTV content, it can only be viewed by an IPTV device. Therefore, the second display device 36 is not capable of previewing the content, since certain authentications are only performed in the IPTV system, which are not performed for interact content URLs. Thus, there will be content only available in the IPTV system that is not generally available.

In order to share content, the user should have already established a list of other users (friends list) using respective second display devices 36. This is done using the normal add other users/friends mechanism on the second display device 36, such as typically used among social networking sites. The user can select to share the content with some or all the other users on the list.

The indication of shared content is received by modules that control the first display devices. The modules can be hardware or software. The modules can be provided in one second display device that controls all first display devices. Alternatively, the modules can be in multiple second display devices, where each second display device controls one or more first display devices. Furthermore, the modules can be built into the first display devices, with or without the use of second display devices, to control other first display devices.

A proxy server 34 or optional server coordinates communication between the first and second display devices and the server 30. The proxy server 34 can provide a list of devices that the content can be shared with through a list of devices associated with user/recipient account. Alternatively, the module controlling the sharing can locate the first and second display devices to share the content with through device discovery such that the proxy server is not needed. Thus, the second display device can get information about devices it can share content with through device discovery.

It should be noted that the target of the sharing is a user account, not a specific device. Thus, any device that is associated with that user account can be notified of the shared content choice. The notified device can play the shared content if it is content that the device is capable of playing. Therefore, a second display device may be associated with more than one first display device.

For a typical case, a user's second display device 36 is used to browse content choices. It sends commands to the user's first display device 12 to play content. The user's second display device sends information about a content selection to share along with information about the recipient to the IPTV system server (management server 30 or proxy server 34). The IPTV system server notifies the recipient's second display device of the shared content choice. The recipient's second display device is then used to tell the recipient's first display device to play the shared content.

Other embodiments include (a) having the functionality (i.e. browse, content selection, etc) of the user's second display device built into the user's first display device, (b) having the functionality (i.e. notification receipt, etc.) of the recipient's second display device built into the recipient's first display device, (c) having the user's first display device communicate its shared content choice directly to the recipient's second display device, (d) the user's second display device gets information about devices to share content with from the IPTV system server, (e) the user's second display device gets information about devices to share content with through device discovery, (f) the target of sharing is a user account not a device, (g) the second display device is associated with more than one first display device and (h) the shared content is found on the internet instead of the IPTV system.

Figure 5:
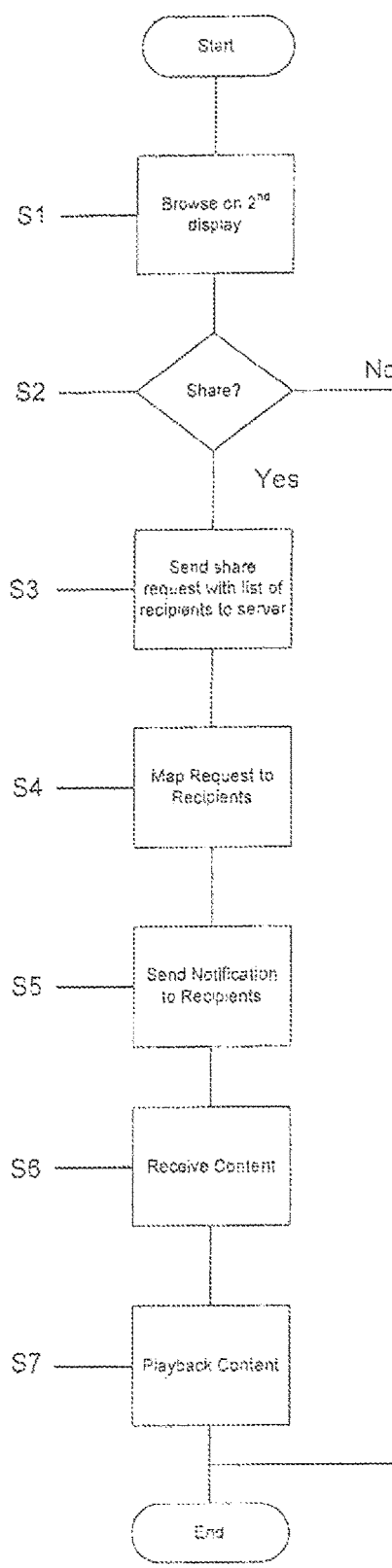
FIG. 5 is a flow chart according to an embodiment of the present invention.

In the preferred embodiment as shown in FIG. 5, (and referring to components in FIG. 1) the second display device (36) controls the first display device (12). The user first browses content, as shown in step S1 on the content provider's website using the second display device (36) using a content browser or web browser. Alternatively, the user can browse the content using the user's IPTV device (12) rather than the second display device (36). The user then decides which content of storage (32*b*) on a content server (32) to share, as shown in step S2 with another user or users (recipient(s)). A content sharing request is then sent by the user to a management server (30) or proxy server (34) with a selected list of other users/friends IDs, as shown in step S3. The server (30, 34) performs the necessary mapping so that the content is available to the selected recipient(s), as shown in step S4. The server (30, 34) then sends a notification to the recipient(s) via the recipient's second display device, as shown step 55 (i.e. sent to second display devices (36) via proxy server (34)). The notification can be a device built into the first display device (i.e. sent to second display device 36 via first display device 12). Alternatively, the notification module can be operatively coupled to the first display device. Alternatively, the server 30 sends the notification directly to the recipients IPTV device (12). Furthermore, if the notification device is built into the user's first display device, the user's first display device sends the notification directly to the recipient's IPTV device (12). The recipient then can elect to receive the content, as shown in step 56.

The recipient can then play back the content on a compatible internet protocol TV (IPTV) (12) of his/her choice, as shown in step S7. When internet content URLs are shared, the recipient is able to preview the content from that URL on the recipient's second display device (36) before sending it to the recipient's internet protocol television (IPTV) (12).

In another embodiment, the content to be shared may be stored on the second display device itself rather than the content providing server (32), This occurs when the second display device contains a camera that is used to capture the contents that is to be shared or when the second display device contains a memory card reader and a memory card with the contents to be shared is inserted into the memory card reader. Thus, the second display device (36) acts as the server providing the content (32) as well as providing the list of selected recipients to share the content on multiple IPTV devices (first display device). However, even in this embodiment, the second display device sends the contents sharing request to the controlling server and not the content itself. The content is transmitted from the server/device hosting the content directly to the IPTV devices playing the content. The second display device may communicate the content to be shared directly to the IPTV device. This occurs when the second display device is also being used to control each of the first display devices as well as being used to share content. Thus, the second display device communicates with the IPTV devices directly and/or communicates with the IPTV devices through a content providing server/controlling server.

Figure 6:
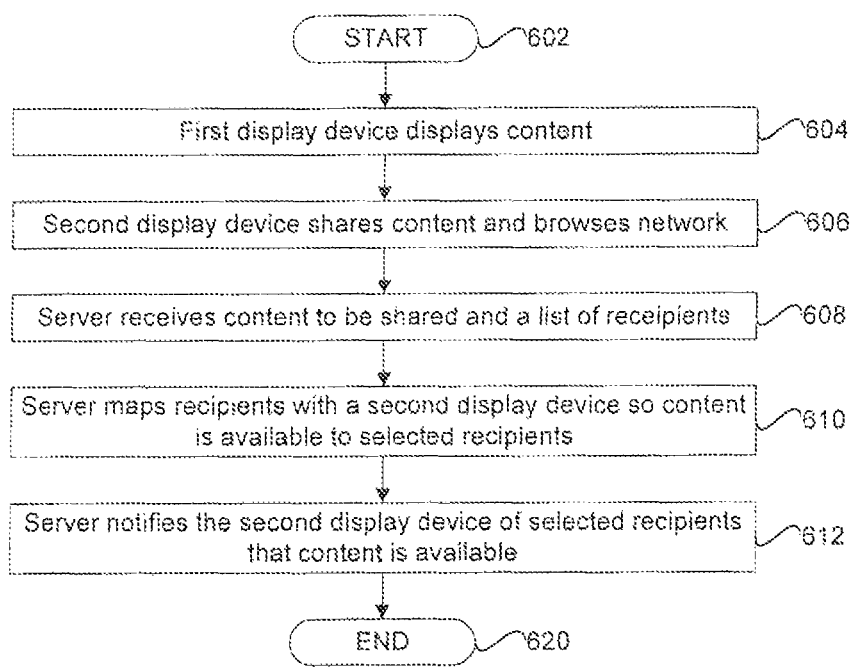
FIG. 6 is a flow chart of steps according to an embodiment of the present invention.

FIG. 6 is a flow chart of steps 600 according to an embodiment of the present invention.

The steps 600 as shown in FIG. 6 may be stored on an electronic storage medium, such as a non-transitory computer-readable medium, such as RAM, ROM, EEPROM, or other medium that may be accessed by a processing device. The process begins with start step 602. A first display device, such as an IPTV device displays content, such as television programs, or Internet content, or other data, as shown in step 604. A second display device, which may be a control device, such as a mobile phone, personal digital assistant (PDA) device, or other processing device, which is typically a portable device shares content and may also browse a network, such as the Internet, as shown in step 606. When the second device is used to browse the Internet, the second device has a web browser application.

As shown in step 608, a server device, which is operatively coupled to the first display device and second display device, receives content that is to be shared as well as a list of recipients that can receive the shared content.

As shown in step 610, the server device maps recipients with a second display device so that content is available to the selected recipients. Step 612 shows that the server device notifies the second display device of the selected recipients that content is available. The content can then be displayed to the selected recipients.

Step 620 shows that the process ends.

Figure 7:
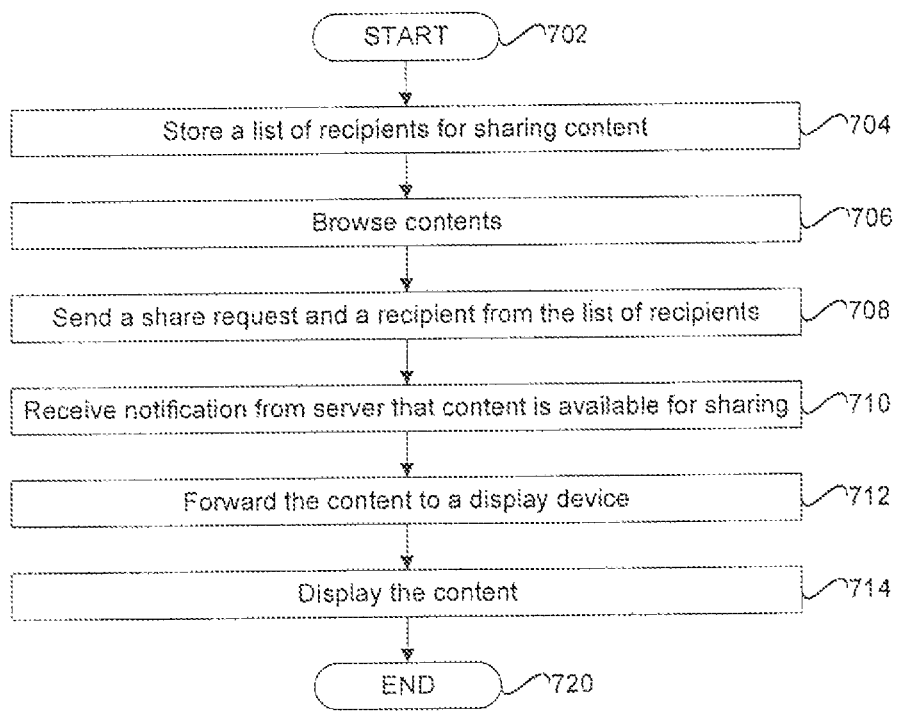
FIG. 7 is a flow chart of steps according to an embodiment of the present invention.

FIG. 7 is a flow chart of steps 700 according to an embodiment of the present invention.

The steps 700 as shown in FIG. 7 may be stored on an electronic storage medium, such as a non-transitory computer-readable medium, such as RAM, ROM, EEPROM, or other medium that may be accessed by a processing device. The process begins with start step 702. In step 704, a list of recipients for sharing content is stored in a memory location. This memory location may be at a portable device or at a server location. Step 706 shows that a user browses content. This browsing is typically done via a network, such as the Internet, using a portable device that has a web browsing application.

Step 708 shows that a share request and a selected recipient is sent from a portable device to a server device. The selected recipient is selected from a list of recipients. The portable device then receives notification from the server that content is available for sharing, as shown step 710. Step 712 shows that the content to be shared is forwarded to a display device, such as an IPTV device. Step 714 shows that the IPTV device displays the shared content.

End step 720 shows that the process ends.

Figure 8:
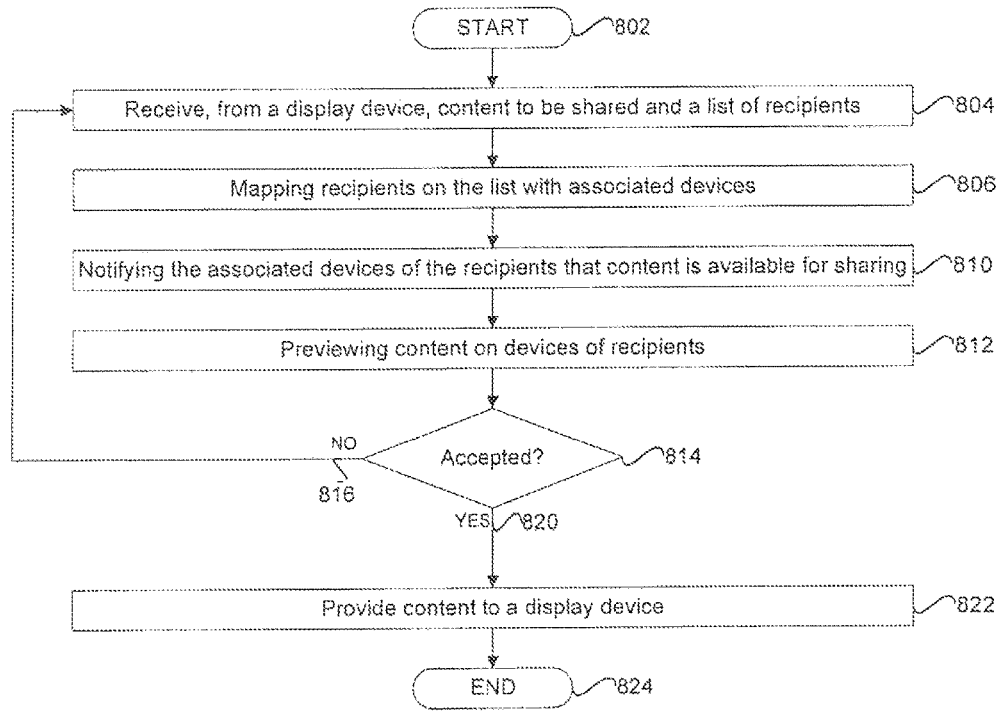
FIG. 8 is a flow chart of steps according to an embodiment of the present invention.

FIG. 8 is a flow chart of steps 800 according to an embodiment of the present invention.

The steps 800 as shown in FIG. 8 may be stored on an electronic storage medium, such as a non-transitory computer-readable medium, such as RAM, ROM, EEPROM, or other medium that may be accessed by a processing device. The process begins with start step 802.

In step 804 a server device receives content to be shared and a list of recipients. This is transmitted from a display device. Step 806 shows that recipients are mapped with an associated device. In step 810, the associated devices of the recipients are notified that content is available for sharing. In step 812, the content is previewed on a device. If the previewed content is not desired, or accepted, as shown in step 814, line 816 shows that the content is not provided to a display device. When the previewed content is accepted, line 820 shows that the content is provided to a display device, such as an IPTV device, for display, as shown in step 822.

End step 824 shows that the process ends.

Like all other assets in the Internet content providing service compatible with a second display device, recommended assets can also be managed on the second display device and put into favorite lists or user created content services.

Figure 9:
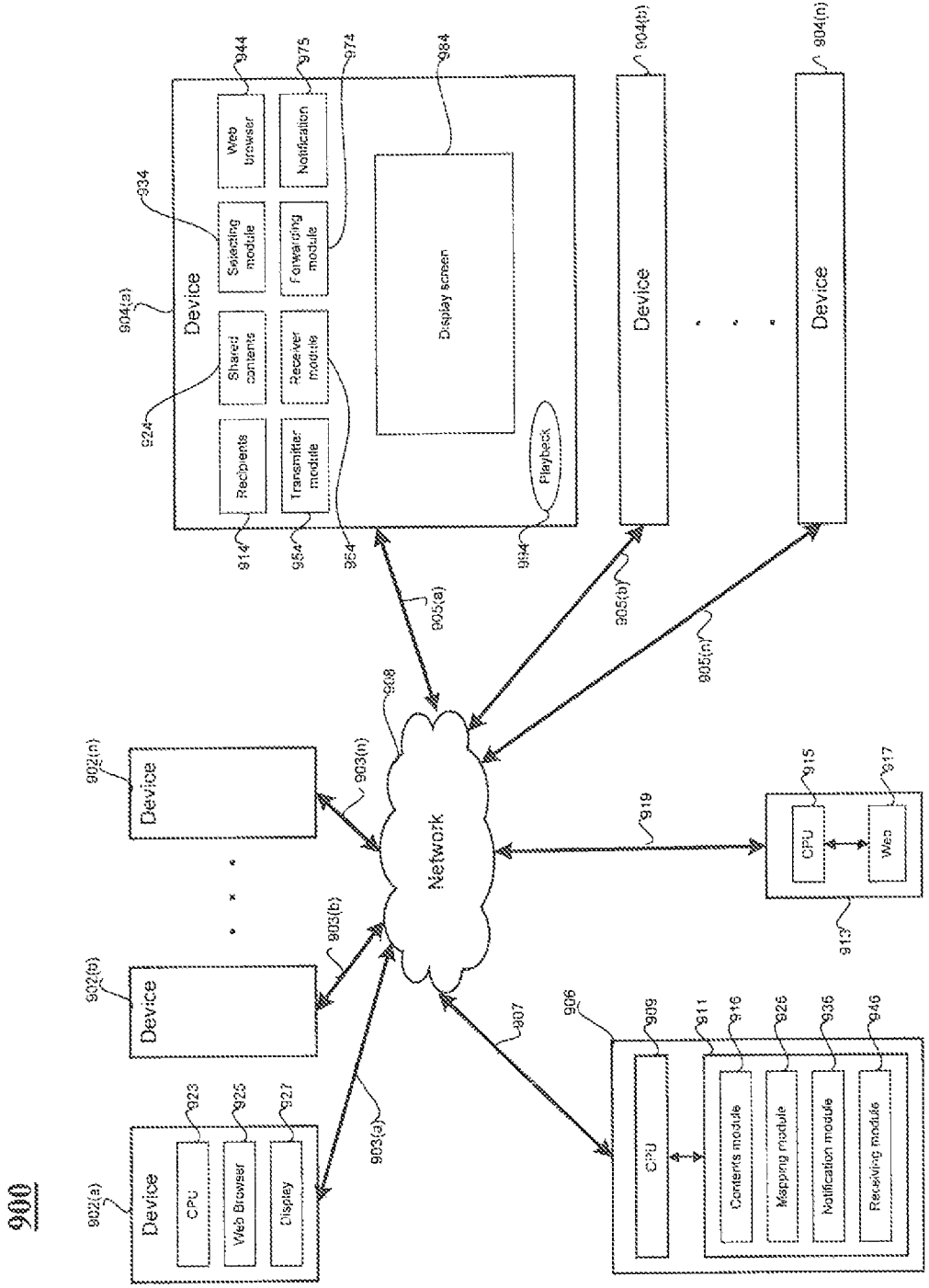
FIG. 9 is a diagram of various components of an embodiment of the present invention.

FIG. 9 shows a diagram of various components of an embodiment of the present invention. Specifically, FIG. 9 shows a network environment 900 adapted to support various embodiments of the present invention. The system 900 shown in FIG. 9 includes a network 908, first display devices, or modules 902(a) . . . (n) (where "n" is any suitable number), content server 913, IPTV system server 906 and one or more second display devices, or modules 904(a) . . . (n) (where "n" is any suitable number). A module, as used herein, is for example, an apparatus and/or a processor coupled to a memory that may be used to process instructions or a module may be instructions or a series of instructions stored on a non-transitory computer readable, or an electronic storage medium storing program code, or a memory unit storing instructions that is coupled to an associated or dedicated or remote or available processing unit for execution of the instructions, the module may be a plugin unit, stand alone set of instructions, or program code or may be an integral part of a larger component. Each module may be stored in a separate memory or a common computer memory.

Network 908 is, for example, any combination of linked computers, or processing devices, adapted to transfer and process data. The network 908 may be private Internet Protocol (IP) networks, as well as public IP networks, such as the Internet that can utilize World Wide Web (www) browsing functionality. An example of a wired network is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems that enable connection to the Internet or other machines that have Wi-Fi functionality. Wi-Fi networks broadcast radio waves that can be picked up by Wi-Fi receivers that are attached to different computers.

First display devices 902(a) . . . (n) (where "n" is any suitable number) (generally referred to as 902) are coupled to network 908 via an associated bi-directional communication medium 903(a) . . . (n), which may be for example a serial bus such as IEEE 1394, or other wire or wireless transmission medium. Display devices 902 may be IPTV devices, communication appliances, or user locations, or subscriber devices, or client terminals that are used to display content. Display devices 902 typically include a CPU 923, web browser 925 and display module 927. The display module 927 may be, for example, a display screen, or LCD, or plasma screen to display content.

Content server 913 is a data storage and processing device with suitable memory and speed. The server 913 includes a CPU (central processing unit) 915, supporting circuitry, hard drives I/O ports and memory. The server 913 also has a web browser 917 that is adapted to search and/or browse the Internet or another network and may be a program such as Internet Explorer™. The server 913 is, for example, a webserver that communicates with the network 908 via an acceptable language, such as HTML and serves the content to be shared. The content server 913 typically stores content that is to be displayed on one or more of the display devices 902. The content server 913 is operatively coupled to network 908 via bi-directional communication medium 919, which may be a wired or wireless connection.

Server apparatus 906, which may also be referred to as an IPTV system server, is a data storage and processing device with suitable memory and speed. The server 906 includes a CPU (central processing unit), supporting circuitry, hard drives I/O ports and memory. The server 906 may also be a webserver.

As shown in FIG. 9, server 906 includes CPU 909 and memory 911 and is operatively coupled to network 908 via bi-directional communication means 907. The bi-directional communication means 907 is, for example, a serial bus such as IEEE 1394, or other wired or wireless transmission medium.

Server CPU 909 is a processing unit, or module that has suitable memory and processing speed to perform the desired function. This may include, for example, 2 GB RAM, 2.4 GHz frequency and 160 GB hard drive. CPU 909 is operatively coupled to memory module 911, which includes a contents module 916, a mapping module 926, a notification module 936 and a receiving module 946.

The contents module 916 is an electronic memory or storage medium that stores content, such as audio data, video data, image data, links and other desired information that may be obtained, stored and/or transmitted in an electronic format. The content stored in contents module 916 may also include content URLs (uniform resource locators), Internet content having URLs, content that is available to IPTV devices using IPTV protocol and other content available either utilizing a network, such as an IPTV network, Internet or other series of operatively coupled processing devices. The memory module or facility 916 may be a non-transitory computer-readable medium.

Mapping module 926 is an electronic memory or storage medium that stores data used for mapping recipients in a selected list of recipients with at least one first display device (902) and/or second display device 904 associated with each selected recipient such that the content is available to the selected recipients. This may be achieved using the user account data as described herein.

In an embodiment of the present invention, the server 906 can communicate with the first display device 902 and the second display device 904. In this embodiment, the notification module 936, which is an electronic storage medium, such as a non-transitory electronic storage medium that stores data in an electronic format, presents a notification to the user. The notification module 936 is used to provide notification of the first display device 902 and/or the second display device 904 of the selected recipients that content is available far viewing on the recipient's display device (902/904). The notification module 936 may be in communication, via network 908, with other components of system 900.

Receiving module 946 is an electronic storage medium, such as a non-transitory electronic storage medium that stores data in an electronic format. The receiving module 946 is used to store a request to share content and a list of selected recipients to share the content therewith.

Display devices 904(a) . . . (n) (where "n" is any suitable number) (generally referred to as 904 herein) are coupled to network 908 via an associated bi-directional communication medium 905(e) . . . (n), which may be for example a serial bus such as IEEE 1394, or other wired or wireless transmission medium. Display devices 904 may be communication appliances, or user locations, or subscriber devices, or client terminals. For example, devices 904 may be computers, or other processing devices such as a desktop computer, laptop computer, personal digital assistant (PDA), cellphone, wireless handheld device and the like.

Display device 904 includes a display screen 984, which may be a plasma screen, LCD or other suitable display device. The display device 904 also includes recipients module 914, shared contents module 924, selecting module 934, web browser 944, transmitting module 954, receiving module 964, forwarding module 974, notification module 975 and playback module 994.

Recipients module 914 is an electronic storage medium, such as a non-transitory electronic storage medium that stores data in an electronic format. The data includes recipients' electronic addresses that can receive content. Shared contents module 924 is an is en electronic storage medium, such as a non-transitory electronic storage medium that stores data in an electronic format that stores content that is, or may be, shared between one or more devices, such as devices 902 and 904.

In an embodiment of the present invention, when content to be shared includes IPTV content, the second display device of the recipient may not be capable of previewing the content before the second display device of the recipient sends the content to the recipient's first display device. The first display device may be independent of the second display device.

Selecting module 934 is an electronic storage medium, such as a non-transitory electronic storage medium that stores data in an electronic format related to selecting desired recipients that may receive content from device 904. The web browser 944 is adapted to search and/or browse the Internet or another network and may be a program such as Internet Explorer™.

Transmitting module 954 is a transmitter or an I/O port that is used to transmit or provide electronic signal to another destination, typically via network 908 via transmission medium 905. Receiver module 964 is used to receive data, content or other information at device 904. Forwarding module 974 is used to forward information from device 904 to another device or module in system 900. Typically this forwarding module 974 is a cache memory that collects data, content and the like for subsequent re-transmission.

Notification module 975 is an electronic storage medium, such as a non-transitory electronic storage medium that stores data in an electronic format related to other devices, or destinations that the device 904 may forward content to. This provides a receiving device with an indication that content will be transmitted there.

In one embodiment of the present invention, when content to be shared includes internet content URLs, a second display device 904 of the selected recipient is notified that content is available and the second display device 904 is capable of previewing the content on the recipient's second display device. This preview may occur before the second display device 904 of the recipient sends the content to the recipients first display device 902.

Playback module 994 is a module that, when actuated, enables playback of content on display screen 984.

As shown in FIG. 9, a second device (i.e., 904(*a*)) may be used to browse content choices. The second device (904(*a*)) sends command to an IPTV device (i.e. 902(*a*)) for that device (902(*a*)) to play content. The second device (904(*a*)) also sends information about a content selection to share along with information about the recipient device (e.g., 904(*b*)) to server 906. The server 906 notifies the recipient 904(*b*) of the shared content choice. The recipient device 904(*b*) may then be used to inform another display device (e.g., 902(*b*)) to play the shared content. Thus another display device 902(*b*) can display the content.

Yet another embodiment of the present invention illustrated in FIG. 9 is that the functionality of a particular display device (e.g., 904(*a*)) is built into a selected IPTV device (e.g., 902(*a*)) that is operatively coupled to a display device 904(*b*). In this embodiment device 904(*a*) is not necessary since the functionality of the device 904(*a*) is built into device 902(*a*).

Yet another embodiment of the present invention illustrated in FIG. 9 is that that the functionality of a particular display device (e.g., 904(*b*)) is built into a particular IPTV device (e.g., 902(*b*)), wherein the particular display device 904(*b*) is operatively coupled to the particular IPTV device 902(*b*). Similar to the above-describe embodiment, in this embodiment device 904(*b*) is not necessary since the functionality of the device 904(*b*) is built into device 902(*b*).

Yet another embodiment of the present invention illustrated in FIG. 9 is that an IPTV device (902(*a*)) communicates its shared content choice with a desired display device (904(*b*)) and does not utilize IPTV system server 906.

Yet another embodiment of the present invention illustrated in FIG. 9 is that a display device 904(*a*) obtains information about other devices that display device 904(*a*) can share information with from IPTV system server 906.

Yet another embodiment of the present invention illustrated in FIG. 9 is that a display device 904(*a*) obtains information about other devices that the display device 904(*a*) can share information or content or otherwise communicate with via a device discover process, such as an API (application programming interface), or "ping" or other mechanism to determine or identify devices available for communication.

Yet another embodiment of the present invention is directed to another device that has been identified as available for communication, (the "target" device) may be a user account rather than the display device (i.e., device 904). Any device that is associated with the user account can be notified of the shared content choice and can play or display the content, provided the target device has the necessary functionality. This embodiment may be implemented where the target device of the sharing is another device. Also, the target device and display device(s) may be associated with the same user and/or same user account.

Yet another embodiment of the present invention is directed to a display device 904(*a*), being associated with more than one IPTV devices 902(*a*), 902(*b*).

Yet another embodiment is directed to a device that indicates sharing content indicates a content selection that was obtained via the Internet, rather than the IPTV system.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Indeed, the present invention may be implemented in a distributed or "cloud" computing environment in which shared resources, software and information are provided to computers and other devices over a network, which may be, for example, the Internet. "Cloud computing" typically involves delivering hosted services over the Internet. A cloud service typically has three distinct characteristics that differentiate it from traditional hosting. One characteristic is that it is usually sold on demand, typically by the minute or the hour secondly, it is elastic—a user can have as much or as little of a service as they want at any given time; and thirdly, the service is usually fully managed by the provider (the consumer, or end user needs nothing but a personal computer and Internet access). Innovations in virtualization and distributed computing, as well as improved access to high-speed Internet have facilitated utilization of cloud computing. The cloud can be private or public. A public cloud typically sells services to anyone on the Internet. A private cloud is a typically a proprietary network or a data center that supplies hosted services to a limited number of people. When a service provider uses public cloud resources to create their private cloud, the result is called a virtual private cloud. Private or public, the goal of cloud computing is to provide easy, scalable access to computing.

"Distributed computing", or "distributed systems" relate to a system of multiple autonomous computers or processing devices or facilities that communicate through a network. The computers interact with each other in order to achieve a particular goal. A computer program that runs in a distributed system is typically referred to as a "distributed program" and "distributed programming" is the process of writing such programs. Distributed computing also refers to the use of distributed systems to solve computational problems. Typically, in distributed computing, a problem is divided into multiple tasks, each of which is solved by one or more computers.

Indeed, as shown herein, specifically in FIG. 9, the processing of servers 906 and 913 may be distributed between a plurality of server devices that may be remotely located. The results of the processing may be propagated throughout the system 900 via network 908, such that the data may be received and/or further processed and/or manipulated by the other devices/modules of system 900.

In the present invention, the sharing mechanism is platform independent. The notification of receipt of a shared asset goes to the user, via the user's second display device, instead of the platform. Using the second display device infrastructure, the user can choose any internet protocol TV (IPTV) associated with his/her content providing service account for playback. The internet protocol TV (IPTV) needs only to support generic second display device compatibility playback of contents. The internet protocol TV (IPTV) does not need to have any knowledge of social networking, which otherwise would require a significant software code change in the internet protocol television (IPTV) platform. In addition, when the user adds a new device as the second display device, the new device automatically inherits the recommendations of the second display device.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. Although illustrative embodiments of the invention have been described in detail herein with reference to the accompanying drawings, it is to be understood that the invention is not limited to those precise embodiments, and that various changes and modifications can be effected therein by one skilled in the art.

What is claimed is:

1. A control display device for an IPTV content providing system having one or more IPTVs (internet protocol TVs) as first display devices, the control display device comprising:
    a storing device stores a list of IPTV recipients for sharing contents, the recipients being associated with the IPTV content providing system;
    a content browsing device browses contents in the IPTV content providing system;
    a sending device sends a share request to a server and sends therewith at least one IPTV recipient from the list of IPTV recipients for sharing contents;
    a receiving device receives notification from the server that content is available for sharing on the IPTV recipient's IPTV device; and
    a forwarding device forwards only a request to share the content to the server and not the content itself, and the server transmits the content, via a control display device of the IPTV recipient, to one of the first display devices of the IPTV recipient to display the content, wherein the server transmits the content based solely on the request and without an IPTV recipient interaction;
    wherein when content to be shared is IPTV content, the control display device of the IPTV recipient lacks authentications necessary to preview the content on the control display device of the IPTV recipient before the control display device of the IPTV recipient sends the content to the IPTV recipient's first display device which is independent of the control display device.

2. The control display device according to claim 1, wherein the content to be shared includes (a) internet content having content URL's and (b) content only available to IPTV devices using IPTV protocol.

3. The control display device according to claim 1, wherein when content to be shared are internet content URLs, the control display device of the IPTV recipient is capable of previewing the content on the control display device of the IPTV recipient before the control display device of the IPTV recipient sends the content to the IPTV recipient's first display device.

4. The control display device according to claim 1, wherein the server is a content provider server.

5. The control display device according to claim 1, further comprising a playback device which plays content when the shared content is a content URL.

6. The control display device according to claim 1, wherein the control display device being one of a cell phone, laptop computer and a personal computer.

* * * * *